United States Patent
Shibuya (10) Patent No.: US 9,250,400 B2
(45) Date of Patent: Feb. 2, 2016

(54) OPTICAL RECEPTACLE AND OPTICAL MODULE INCLUDING THE SAME

(71) Applicant: ENPLAS CORPORATION, Kawaguchi-shi (JP)

(72) Inventor: Kazutaka Shibuya, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 0 days.

(21) Appl. No.: 14/288,053

(22) Filed: May 27, 2014

(65) Prior Publication Data

US 2014/0355939 A1    Dec. 4, 2014

(30) Foreign Application Priority Data

May 30, 2013  (JP) ................. 2013-113965

(51) Int. Cl.
  *G02B 6/36*  (2006.01)
  *G02B 6/32*  (2006.01)
  *G02B 6/42*  (2006.01)

(52) U.S. Cl.
  CPC .......... *G02B 6/4204* (2013.01); *G02B 6/4206* (2013.01); *G02B 6/4292* (2013.01)

(58) Field of Classification Search
  CPC ............ G02B 6/26; G02B 6/42; G02B 6/421; G02B 6/4204; G02B 6/4206; G02B 6/4292
  USPC ......................... 385/33, 37, 88–93
  See application file for complete search history.

(56) References Cited

U.S. PATENT DOCUMENTS

| | | | |
|---|---|---|---|
| 6,120,191 A * | 9/2000 | Asakura et al. ................. 385/93 |
| 2002/0141142 A1* | 10/2002 | Rookes .......................... 361/538 |
| 2004/0062492 A1* | 4/2004 | Bergmann et al. .............. 385/88 |
| 2005/0041936 A1* | 2/2005 | Billet et al. ..................... 385/93 |
| 2006/0086947 A1* | 4/2006 | Johnson ........................ 257/100 |
| 2009/0263087 A1 | 10/2009 | Oshima et al. |

FOREIGN PATENT DOCUMENTS

JP    2009-258365 A    11/2009

* cited by examiner

*Primary Examiner* — Akm Enayet Ullah
*Assistant Examiner* — Michael Mooney
(74) *Attorney, Agent, or Firm* — Law Office of Katsuhiro Arai (57) ABSTRACT

An optical receptacle includes a cylindrical optical fiber attaching section for attaching an end portion of an optical fiber by insertion; a cylindrical photoelectric conversion device attaching section that includes an inner circumferential surface into which a photoelectric conversion device having a light-receiving element is inserted and for attaching the photoelectric conversion device with an adhesive that is interposed within an annular adhesion space; and a lens for optically coupling the end portion of the optical fiber and the light-emitting element, and the lens is a Fresnel lens in which a second face that faces the light-receiving element includes a convex face.

2 Claims, 6 Drawing Sheets

OPTICAL RECEPTACLE AND OPTICAL MODULE INCLUDING THE SAME

TECHNICAL FIELD

The present invention relates to an optical receptacle and an optical module including the optical receptacle. In particular, the present invention relates to an optical receptacle suitable for optically coupling an end portion of an optical fiber and a light-receiving element of a photoelectric conversion device with excellent optical characteristics, and an optical module including the optical receptacle.

BACKGROUND ART

An optical module component referred to as an optical receptacle has been used since the past in optical communication using optical fibers. The optical receptacle is configured such that an end portion of an optical fiber held within a cylindrical ferrule is inserted into the optical receptacle together with the ferrule and fixed thereto. In addition, a photoelectric conversion device having a photoelectric conversion element is attached to the optical receptacle. The optical receptacle onto which the photoelectric conversion device and the optical fiber are assembled in this way optically couples the photoelectric conversion element and the end portion of the optical fiber.

Figure 6A:
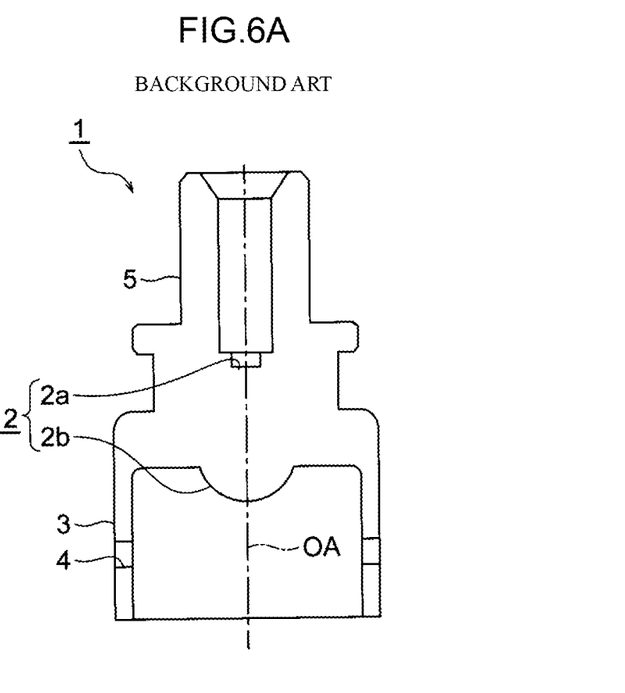
FIG. 6A A vertical cross-sectional view of a configuration example of a conventional optical receptacle.
Figure 6B:
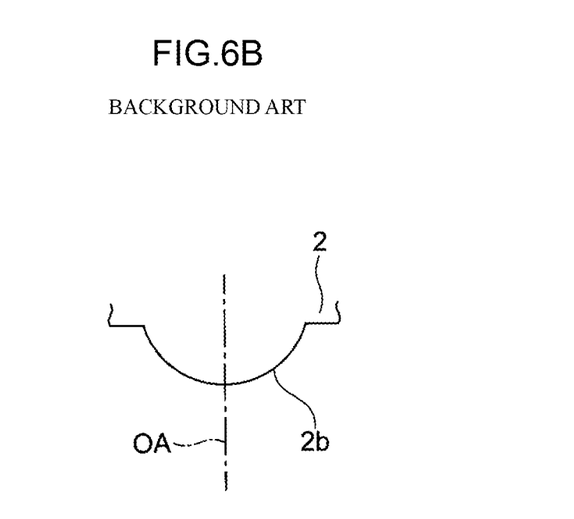
FIG. 6B An enlarged view of a second face portion of a lens in FIG. 6A.

Here, FIG. 6 shows an example of this type of optical receptacle 1 (refer to, for example, FIG. 4 of Patent Literature 1). The optical receptacle 1 is integrally formed by injection molding of a light-transmitting resin material, such as polyetherimide (PEI), polycarbonate (PC), polyethersulfone (PES), cyclo olefin polymer (COP), or poly (methyl methacrylate) (PMMA).

As shown in FIG. 6, the optical receptacle 1 has a lens 2 in a substantially center position in a length direction. The lens 2 is formed into a plano-convex lens in which a first face 2a on the upstream side of light in an optical axis OA direction of the lens 2 (upper side in FIG. 6) is a planar face, and a second face 2b on the downstream side of light (lower side in FIG. 6) is a convex face.

In addition, as shown in FIG. 6, the optical receptacle 1 has a photoelectric conversion device attaching section 3 that extends from an outer position in a radial direction of the lens 2 towards the downstream side (lower side in FIG. 6) in the optical axis OA direction. The photoelectric conversion device attaching section 3 is formed into a cylindrical shape of which an inner circumferential surface is a circular cylindrical surface that is concentric with the optical axis OA. However, as shown in FIG. 6, a through-hole 4 is drilled in the photoelectric conversion device attaching section 3 to allow gas to escape outside, the gas being generated from an adhesive (such as thermoset resin) when a photoelectric conversion device is fixed to the photoelectric conversion device attaching section 3 using the adhesive.

Furthermore, as shown in FIG. 6, the optical receptacle 1 has an optical fiber attaching section 5 that extends from the outer position in the radial direction of the lens 2 towards a direction in the optical axis OA direction opposite to the photoelectric conversion device attaching section 3. The optical fiber attaching section 5 is formed into a cylindrical shape of which an inner circumferential surface is a substantially circular cylindrical shape that is concentric with the optical axis OA.

Figure 7:
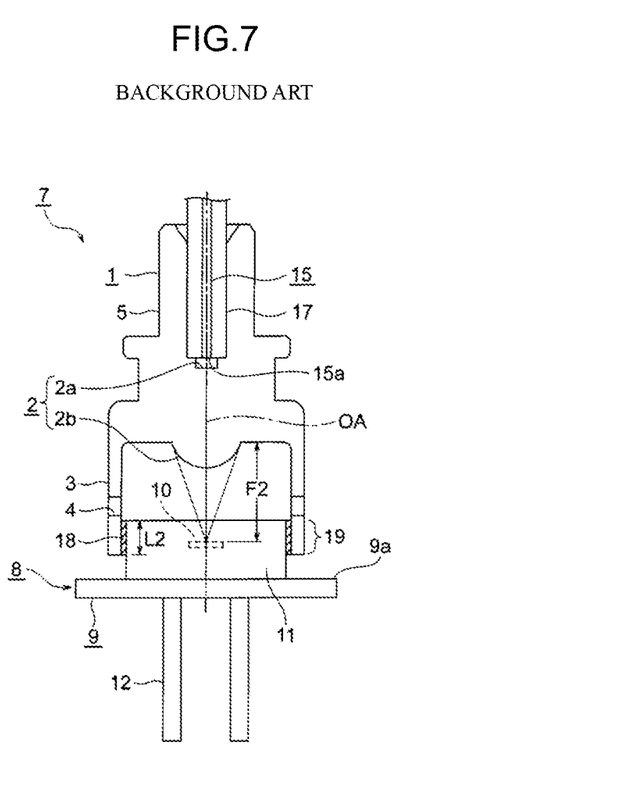
FIG. 7 A vertical cross-sectional view of a configuration example of a conventional optical module.

Next, FIG. 7 shows an optical module 7 for reception as an example of an optical module including the optical receptacle 1, such as that described above.

In other words, as shown in FIG. 7, in the optical module 7, a CAN-package-type photoelectric conversion device 8 including an optical reception function is attached to the photoelectric conversion device attaching section 3 of the optical receptacle 1 by an adhesive 18. More specifically, as shown in FIG. 7, the photoelectric conversion device 8 is configured by: a circular disk-shaped stem 9; a light-receiving element 10, such as a photodetector (PD), mounted on the stem 9; a cap 11 having a window portion in the peak portion and disposed such as to cover the light-receiving element 10; and a lead 12 through which electrical signals flow based on a light-reception result (photoelectric conversion) of the light-receiving element 10.

In addition, as shown in FIG. 7, in the optical module 7, an optical fiber 15 is detachably attached, together with a ferrule 17 that holds the optical fiber 15, to the optical fiber attaching section 5.

In the optical module 7 for reception such as that described above, light including transmission information that has been transmitted from a transmission-side device (such as a semiconductor laser LD) is transmitted over the optical fiber 15 and emitted from an end portion (end face) 15a of the optical fiber 15 towards the lens 2. The light emitted towards the lens 2 is then converged by the lens 2 and emitted towards the photoelectric conversion device 8. Thereafter, the light is received by the light-receiving element 10 of the photoelectric conversion device 8. In this way, the end portion 15a of the optical fiber 15 and the light-receiving element 10 are optically coupled.

In the optical module 7, the optical fiber 15 is used so as to be frequently attached and detached to and from the optical fiber attaching section 5, together with the ferrule 17.

PRIOR ART LITERATURES

Patent Literatures

Patent Literature 1: Japanese Patent Laid-open Publication No. 2009-258365

SUMMARY OF INVENTION

Problem to be Solved by the Invention

Regarding the optical receptacle 1 formed as described above, there is a demand for higher accuracy and further compactness of the overall configuration.

However, the size of the optical receptacle 1 is compact, at about 3 mm in total length and about 2 mm in outer diameter. Therefore, molding with favorable spreading of resin and high accuracy, and attachment of the photoelectric conversion device 8 and the optical fiber 15 with high accuracy and high strength are difficult.

More specifically, attachment of the photoelectric conversion device 8 to the photoelectric conversion attaching section 3 of the optical receptacle 1 is performed by the adhesive 18 being interposed within a circular cylindrical adhesion space 19 between an inner circumferential surface of the photoelectric conversion device attaching section 3 and an outer circumferential surface of the cap 11 of the photoelectric conversion device 8, the adhesion space 19 having an axial length of L2 and at which the photoelectric conversion device attaching section 3 and the cap 11 overlap. However, because the second face 2b of the lens 2 is a convex face, a focal distance F2 to a position at which light that is emitted to the downstream side is collected is long. Therefore, when the light-receiving element 10 of the photoelectric conversion device 8 is disposed to match the position of the focal distance F2, the axial length L2 of the adhesion space 19 becomes physically short. A problem occurs in that the axial length L2 cannot be lengthened and attachment strength of the photoelectric conversion device 8 to the photoelectric conversion device attaching section 3 cannot be increased.

In addition, in the optical receptacle 1, the optical fiber attaching section 5 and the ferrule 17 are formed such as to be freely attached and detached with predetermined durability and fit-ability. However, in accompaniment with increase in the number of times attachment and detachment is performed, the joining surfaces of both the optical fiber attaching section 5 and the ferrule 17 gradually become abraded. So-called wiggle occurs in which the optical axes of the optical fiber 15 and the ferrule 17 tilt in relation to the optical axes of the optical fiber attaching section 5, the lens 2, and the photoelectric conversion device 8, that are further towards the downstream side.

When wiggle occurs, the optical axis of the optical fiber 15 is tilted in relation to the optical axis of the lens 2. Of the light emitted from the end face 15a of the optical fiber 15, the light on the optical axis and the light that is slightly diffused from the optical axis are collected in the center portion on the optical axis of the light-receiving element 10 by the light-collecting characteristics of the lens 2. However, the light that is widely diffused from the optical axis is not collected in the center portion on the optical axis of the light-receiving element 10, even with the light-collecting characteristics of the lens 2 that is formed into the plano-convex shape. A problem occurs in that coupling efficiency decreases, leading to a decrease in transmission efficiency of optical information.

In addition, in the compact optical receptacle 1, it is difficult for the plano-convex lens 2 to be resin-molded such that the spreading of resin is favorable, accuracy is high, and yield is favorable.

The present invention has been achieved in light of the above-described issues. An object of the present invention is to provide an optical receptacle in which a compact optical receptacle can be molded with favorable spreading of resin and high accuracy, a photoelectric conversion device and an optical fiber can each be attached with high accuracy and high strength, and an end portion of the optical fiber and a light-receiving element of the photoelectric conversion device can be optically coupled with excellent optical characteristics, and an optical module including the optical receptacle.

Means for Solving Problem

To achieve the above-described object, an optical receptacle according to a first aspect of the present invention is an optical receptacle that includes: a cylindrical optical fiber attaching section for attaching an end portion of an optical fiber by insertion; a cylindrical photoelectric conversion device attaching section that includes an inner circumferential surface into which a photoelectric conversion device having a light-receiving element is inserted and for attaching the photoelectric conversion device with an adhesive that is interposed within an annular adhesion space; and a lens for optically coupling the end portion of the optical fiber and the light-emitting element. The lens is a Fresnel lens in which a second face that faces the light-receiving element includes a convex face.

In the invention according to the first aspect, a compact optical receptacle can be molded with favorable spreading of resin and high accuracy, a photoelectric conversion device and an optical fiber can each be attached with high accuracy and high strength, and an end portion of the optical fiber and a light-receiving element of the photoelectric conversion device can be optically coupled with excellent optical characteristics.

In addition, an optical receptacle according to a second aspect is the optical receptacle according to the first aspect in which, further, the Fresnel lens is formed such that a focal point is shorter and an axial length of the adhesion space is longer compared to a convex lens having the same optical power In the invention according to the second aspect, the photoelectric conversion device can be attached to the cylindrical photoelectric conversion device attaching section by an adhesive that is interposed in a long adhesion space. Therefore, the photoelectric conversion device and the optical fiber can each be attached with higher accuracy and higher strength.

Still further, an optical module according to a first aspect of the present invention includes an optical receptacle according to the first or second aspect, the optical fiber according to the first aspect, and the photoelectric conversion device according to the first aspect.

In the optical module according to the first aspect, a compact optical receptacle can be molded with favorable spreading of resin and high accuracy, a photoelectric conversion device and an optical fiber can each be attached with high accuracy and high strength, and an end portion of the optical fiber and a light-receiving element of the photoelectric conversion device can be optically coupled with excellent optical characteristics. The optical receptacle and the optical module have excellent optical characteristics.

Effect of the Invention

In the optical receptacle and the optical module of the present invention such as those described above, a compact optical receptacle can be molded with favorable spreading of resin and high accuracy, a photoelectric conversion device and an optical fiber can each be attached with high accuracy and high strength, and an end portion of the optical fiber and a light-receiving element of the photoelectric conversion device can be optically coupled with excellent optical characteristics. The optical receptacle and the optical module have excellent optical characteristics.

BEST MODE(S) FOR CARRYING OUT THE INVENTION

An embodiment of the present invention will hereinafter be described with reference to FIG. 1 to FIG. 5.

However, sections of which the basic configuration is the same or similar as that in the past are described using the same reference numbers.

Figure 1A:
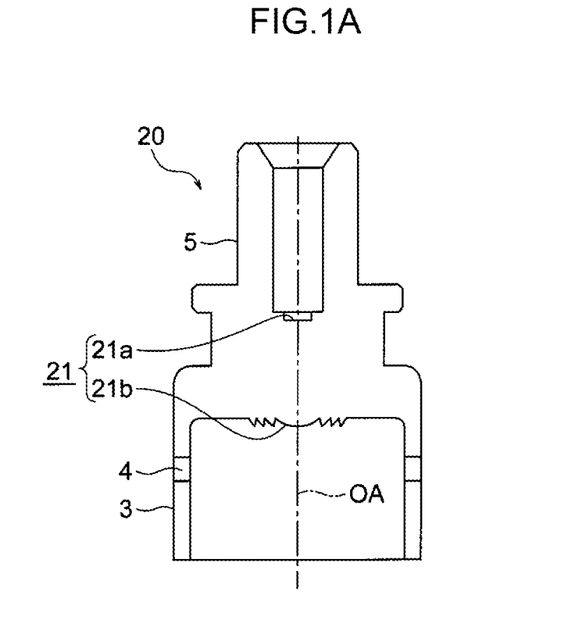
FIG. 1A A vertical cross-sectional view of an optical receptacle according to an embodiment of the present invention.
Figure 1B:
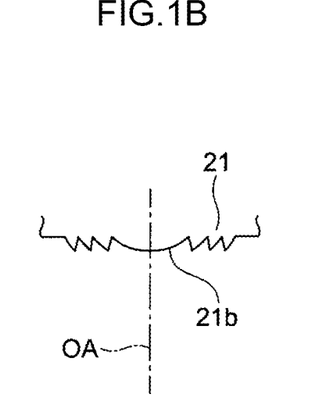
FIG. 1B An enlarged view of a second face portion of a lens in FIG. 1A.
Figure 2:
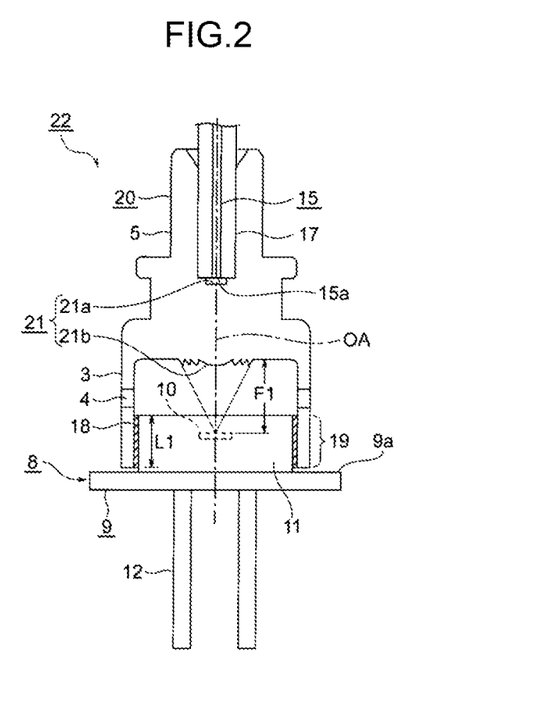
FIG. 2 A vertical cross-sectional view of an optical module according to the embodiment of the present invention.

As shown in FIG. 1 and FIG. 2, in a manner similar to the conventional optical receptacle 1, an optical receptacle 20 according to the present embodiment is configured by a lens 21, a photoelectric conversion device attaching section 3, and an optical fiber attaching section 3 being integrally molded using a light-transmitting resin material. In addition, unlike the conventional example, in the optical receptacle 20 according to the present embodiment, the lens 21 is formed into a Fresnel lens in which a second face 21b that faces a light-receiving element 10 includes a convex face.

More specifically, in the conventional configuration shown in FIG. 6, the lens 2 is formed into a plano-convex lens in which a first face 2a on the upstream side of light in an optical axis OA direction of the lens 2 (upper side in FIG. 6) is a planar face, and a second face 2b on the downstream side of light (lower side in FIG. 6) is a convex face.

Conversely, as shown in FIG. 1, according to the present embodiment, a first face 21a on the upstream side of light in an optical axis OA direction of the lens 21 (upper side in FIG. 1) is formed into a planar face. The second face 21b that faces the light-receiving element 10 on the downstream side of light (lower side in FIG. 1) is formed a Fresnel lens.

In addition, as shown in FIG. 2, in the optical receptacle 20 according to the present embodiment such as that described above, an optical module 22 according to the present embodiment is configured by the optical fiber 15 being attached to the optical fiber attaching section 5 and a photoelectric conversion device 8 being attached to the photoelectric conversion device attaching section 3.

Next, operations according to the present embodiment will be described.

The present embodiment shown in FIG. 1 and FIG. 2 and the conventional example shown in FIG. 6 and FIG. 7 will be described in comparison.

According to the present embodiment and in the conventional example, all configurations are formed in the same manner aside from the difference between the Fresnel lens 21 and the convex lens 2. The Fresnel lens 21 and the convex lens 2 are formed such as to have the same optical power.

Compared to the convex lens 2, the Fresnel lens 21 has superior spreading of resin during resin molding. Therefore, molding can be performed with little thickness deviation, and moldability of the optical receptacle 20 can be improved.

Furthermore, the focal distance F1 of the Fresnel lens 21 is a shorter focal point than the focal distance F2 of the convex lens 2. When the light-receiving element 10 of the photoelectric conversion device 8 is disposed to match the position of the focal distance F1, the axial length L1 of the adhesion space 19 becomes physically longer. The axial length L1 can be lengthened, and attachment strength of the photoelectric conversion device 8 to the photoelectric conversion device attaching section 3 can be increased.

Figure 3A:
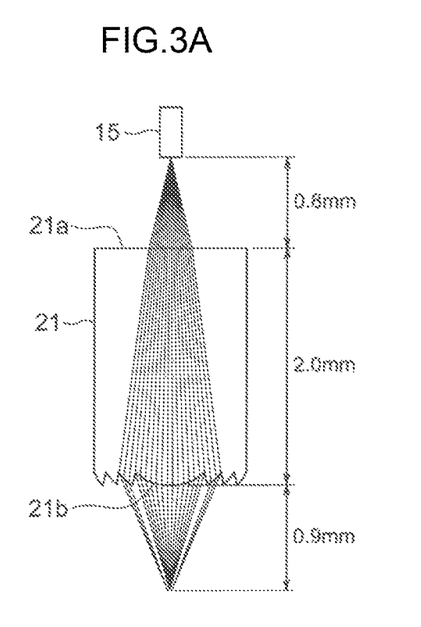
FIG. 3A A schematic diagram of the optical path and size of a Fresnel lens of the present invention.
Figure 3B:
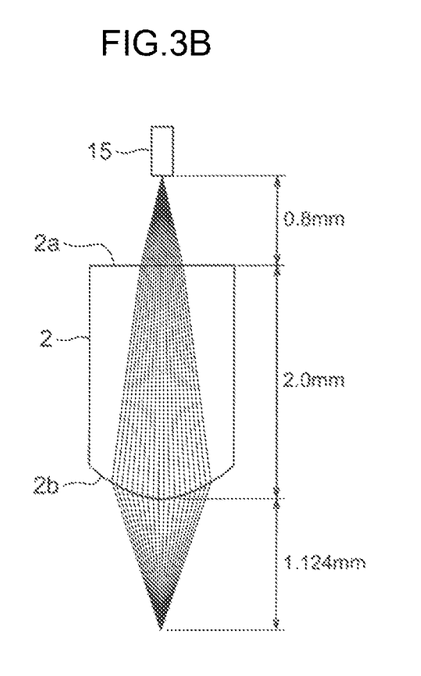
FIG. 3B A schematic diagram of the optical path and size of a conventional convex lens.

For example, with the lens lengths of the Fresnel lens 21 according to the present embodiment shown in FIG. 3A and the convex lens 2 of the conventional example shown in FIG. 3B at 2.0 mm and the distance between the end face 15a of the optical fiber 15 and the first lens faces 21a and 2a of the lenses 21 and 2 at 0.8 mm, when the focal distances F1 and F2 of the lenses 21 and 2 are compared, F1=0.9 mm and F2=1.124 mm. The focal distance of the Fresnel lens 21 according to the present embodiment can be shortened by 0.224 mm, and the axial length L1 of the adhesion space 19 can similarly be lengthened by 0.224 mm. Attachment strength of the photoelectric conversion device 8 to the photoelectric conversion device attaching section 3 can be increased.

Still further, compared to the convex lens 2, the Fresnel lens 21 has a higher effect of refracting light towards the optical axis side and collecting light, even when the light is widely diffused from the optical axis. Therefore, even when wiggle occurs and the optical axis of the optical fiber 15 tilts in relation to the optical axis of the Fresnel lens 21, the light emitted from the end face 15a of the optical fiber 15, even light that is widely diffused from the optical axis, is refracted towards the optical axis side and collected in the center portion on the optical axis of the light-receiving element 10 by the light-collecting characteristics of the Fresnel lens 21. As a result, according to the present embodiment, sufficient responsiveness can be achieved even when wiggle occurs. Coupling efficiency is kept favorable and transmission efficiency of optical information is kept high as a result of the Fresnel lens 21.

Figure 4:
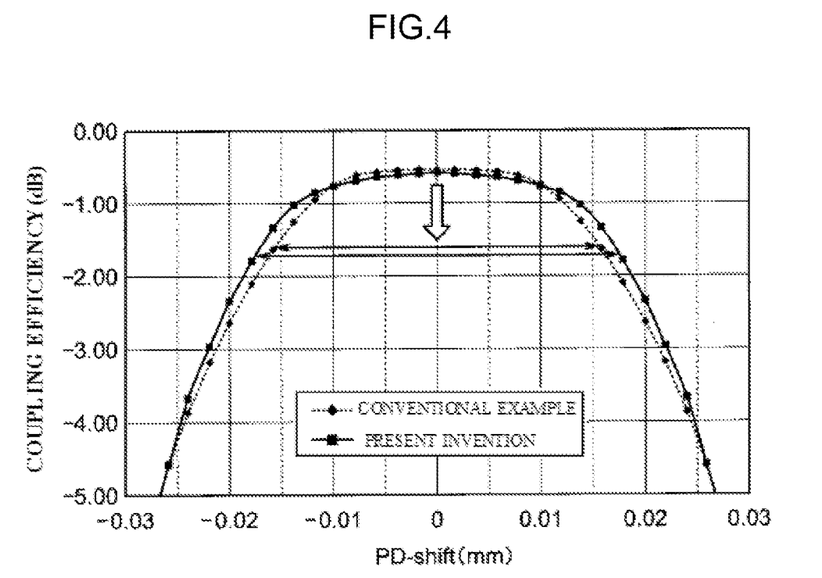
FIG. 4 Tolerance curves indicating a comparison of coupling efficiency when PD shift is performed, between the Fresnel lens of the present invention and the convex lens of the conventional example.
Figure 5:
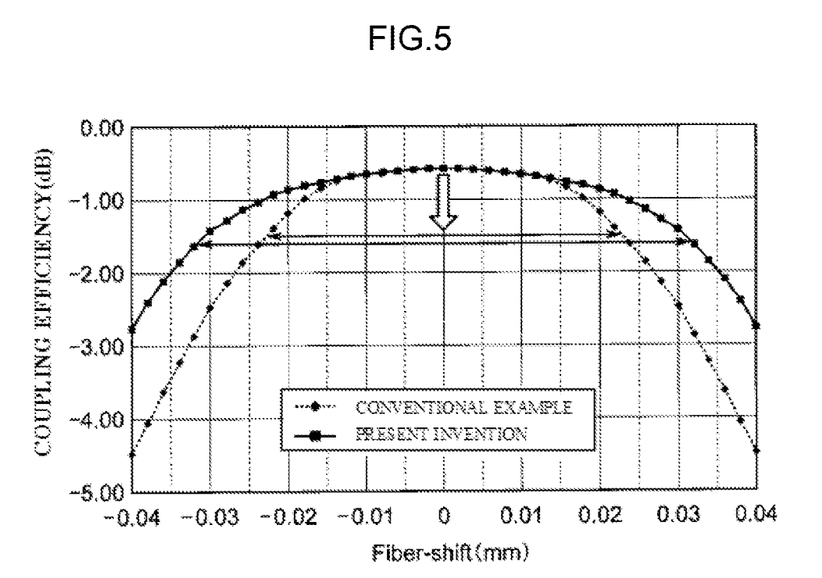
FIG. 5 Tolerance curves indicating a comparison of coupling efficiency when the optical fiber is shifted, between the Fresnel lens of the present invention and the convex lens of the conventional example.

FIG. 4 and FIG. 5 show tolerance curves indicating a comparison of coupling efficiency between the Fresnel lens 21 and the convex lens 2.

FIG. 4 shows an instance in which PD shift is performed. When a point of −1 dB loss from an optimal position is compared, whereas the convex lens 2 of the conventional example is ±16 μm (see broken line), the Fresnel lens 21 of the present example is ±17 μm (see solid line). Compared to the convex lens 2, the Fresnel lens 21 has a leeway of 1 μm in radius and 2 μm in diameter.

FIG. 5 shows an instance in which the optical fiber 15 is shifted. When a point of −1 dB loss from an optimal position is compared, whereas the convex lens 2 of the conventional example is ±23 μm (see broken line), the Fresnel lens 21 of the present example is ±31 μm (see solid line). Compared to the convex lens 2, the Fresnel lens 21 has a leeway of 8 μm in radius and 16 μm in diameter.

Based on the comparison of the tolerance curves in FIG. 4 and FIG. 5 described above, it is clear that the Fresnel lens 21 according to the present embodiment is more capable of achieving sufficient optical characteristics even when the allowable error of the lens is reduced, compared to the convex lens 2.

Therefore, according to the present embodiment, the compact optical receptacle 20 can be molded with favorable spreading of resin and high accuracy, the photoelectric conversion device 8 and the optical fiber 15 can each be attached with high accuracy and high strength, and the end portion 15a of the optical fiber 15 and the light-receiving element 10 of the photoelectric conversion device 8 can be optically coupled with excellent optical characteristics.

The present invention is not limited to the above-described embodiment. Various modifications can be made to an extent that features of the present invention are not compromised.

EXPLANATIONS OF LETTERS OR NUMERALS 3 photoelectric conversion device attaching section
5 optical fiber attaching section
7 light-emitting element
10 light-receiving element
15 optical fiber 20 optical receptacle
21 Fresnel lens
21a first face
21b second face
22 optical module

The invention claimed is:

1. An optical receptacle comprising:
a cylindrical optical fiber attaching section for attaching an end portion of an optical fiber by insertion;
a cylindrical photoelectric conversion device attaching section that includes an inner circumferential surface into which a photoelectric conversion device having a light-receiving element is inserted and for attaching the photoelectric conversion device with an adhesive that is interposed within an annular adhesion space; and
a lens for optically coupling the end portion of the optical fiber and the light-emitting element, wherein
the lens is a Fresnel lens in which a second face that faces the light-receiving element includes a convex face, wherein:
the Fresnel lens is formed such that a focal point is shorter and an axial length of the adhesion space is longer compared to a convex lens having the same optical power.

2. An optical module comprising:
an optical receptacle according to claim 1;
an optical fiber, an end portion of which is attached to a cylindrical optical fiber attaching section by insertion included in the optical receptacle; and
a photoelectric conversion device inserted and attached to a cylindrical photoelectric conversion device attaching section included in the optical receptacle.

* * * * *